United States Patent

[11] 3,618,627

[72] Inventor William Wagner
c/o Watsco, Inc., 1800 W. 4th Ave, Hialeah, Fla. 33010
[21] Appl. No. 872,074
[22] Filed Oct. 29, 1969
[45] Patented Nov. 9, 1971

[54] VALVE AUTOMATIC PRESSURE RELEASE MEANS
1 Claim, 7 Drawing Figs.
[52] U.S. Cl. ................................................ 137/73, 137/72
[51] Int. Cl. .................................................. F16k 17/38
[50] Field of Search ................................... 137/72–74; 220/89 B; 122/504.1, 504.3

[56] References Cited
UNITED STATES PATENTS

| | | | |
|---|---|---|---|
| 1,744,977 | 1/1930 | Lovekin | 137/72 |
| 1,750,335 | 3/1930 | Taylor | 220/89 B X |
| 1,864,380 | 6/1932 | Te Pas | 137/73 |
| 2,295,154 | 9/1942 | Brower | 137/73 |
| 2,859,758 | 11/1958 | Jurs | 137/73 |
| 3,491,783 | 1/1970 | Linsalato | 137/74 X |

Primary Examiner—M. Cary Nelson
Assistant Examiner—Richard Gerard
Attorney—Stoll & Stoll ABSTRACT: An automatic means incorporated into the structure of a system valve for releasing system pressure, the means comprising a fusible element located in the valve between the internal (high) pressure of the system and a low-pressure field such that elimination of the plug releases the system high pressure to the field low pressure. The means may additionally provide for an automatically reclosing pressure relief element such as a spring.

In primary embodiments the automatic pressure release means comprises a fusible plug located in the valve stem. Pressure release is accomplished by elimination of the plug by either thermal or mechanical means, or a combination. In secondary embodiments the plug is angularly located in the valve housing.

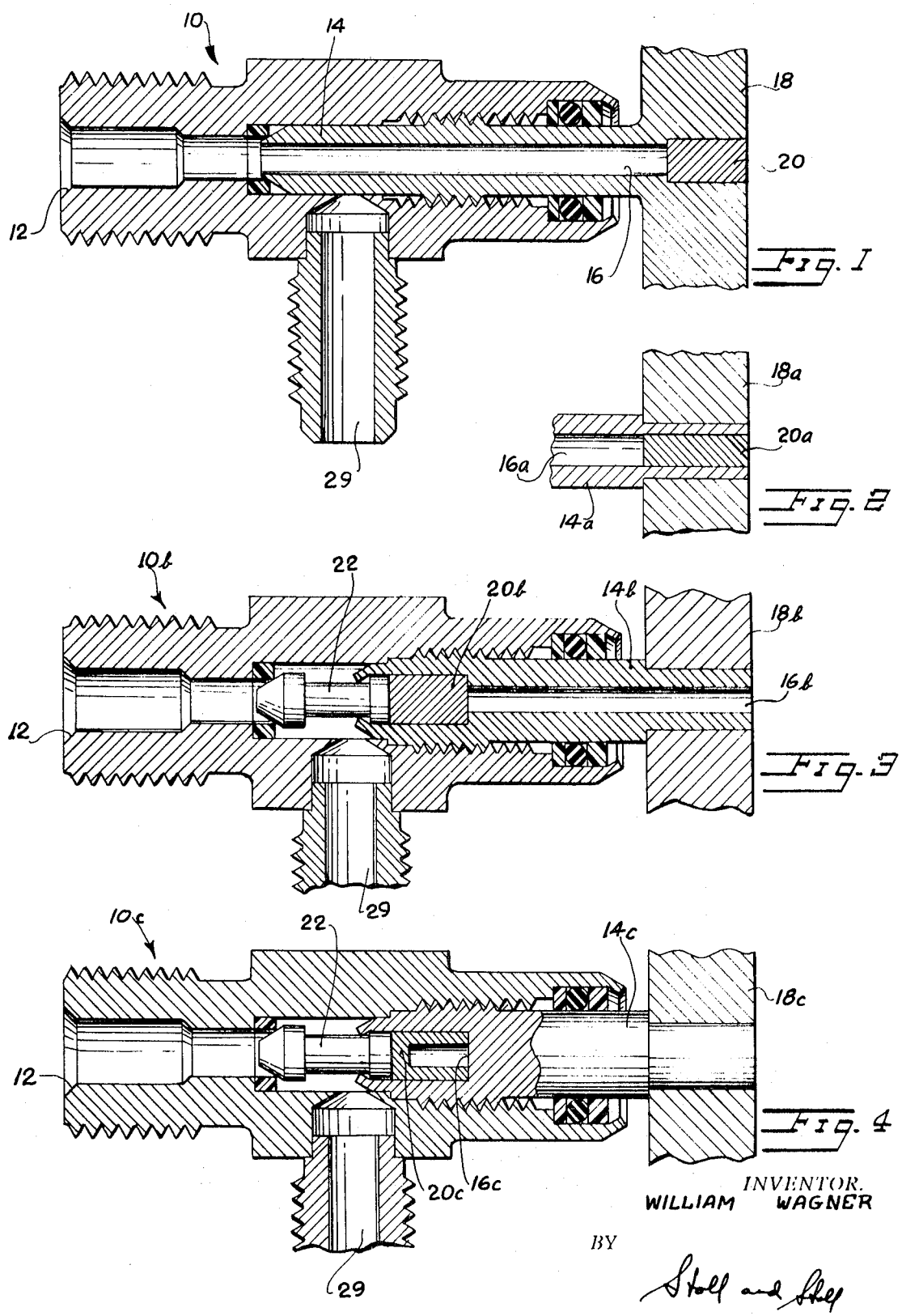

INVENTOR.
WILLIAM WAGNER

VALVE AUTOMATIC PRESSURE RELEASE MEANS

SUMMARY OF THE INVENTION

The present invention provides automatic means for releasing undesirably high pressure in a closed system.

The present invention also provides for the incorporation of those automatic means into the structure of a valve in the system.

The present invention further provides elements which automatically release high pressure by direct mechanical action of that pressure or by thermal action of ambient temperatures.

Basically, and not by way of limitation, the present invention incorporates a fusible element into the valve stem. When the stem is hollow the element may be placed at any longitudinal position therewithin. Depending upon the stem contour the fusible element may be designed to "blow out" under certain internal pressures, this being in addition to its "melt out" abilities.

Additionally, a pressure-responsive spring may be utilized to provide further pressure relief.

BRIEF DESCRIPTION OF THE DRAWING

FIG. 1 is a cross-sectional view of a first form of the valve automatic pressure release means of the present invention.

FIG. 2 is a fragmentary cross-sectional view of a modification of the first form of the present invention as shown in FIG. 1.

FIG. 3 is a cross-sectional view of a second form of the valve automatic pressure release means of the present invention.

FIG. 4 is a partial cross-sectional view of a modification of the second form of the present invention as shown in FIG. 3.

DESCRIPTION OF PREFERRED EMBODIMENTS OF THE INVENTION

Figure 5:
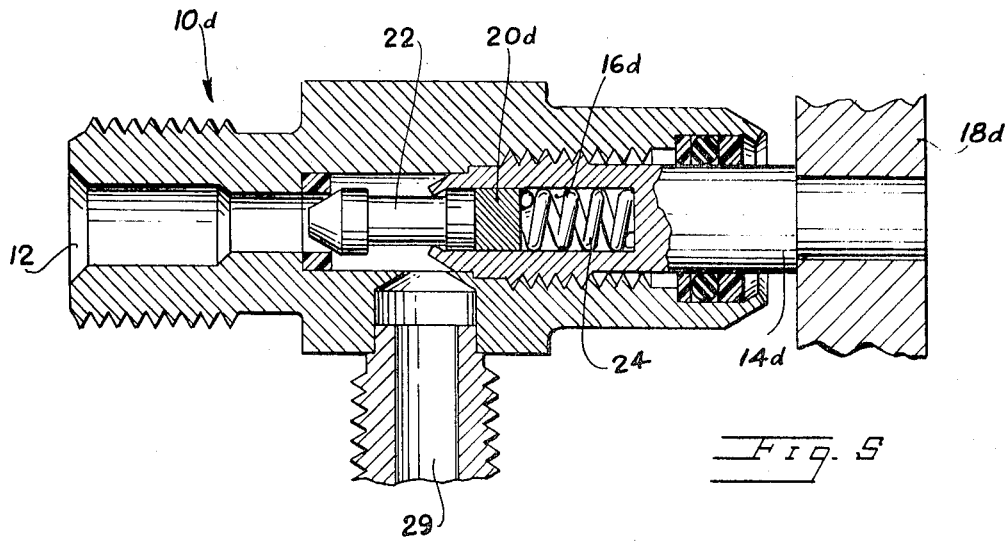
FIG. 5 is a partial cross-sectional view of a second modification of the second form of the present invention as shown in FIG. 3.

Referring to the drawing, a valve 10 has a main port 12 which communicates with a system (not shown) which may become pressurized. Valve 10 has a hollow stem 14 the interior opening 16 in which extends fully from main port 12 through handle 18 to the outside to provide communication between the system and the external field which is commonly the atmosphere. In FIG. 1 the handle 18 and stem 14 are shown as one integral member. Handles 18a and 18b, and stems 14a and 14b in FIGS. 2 and 3 respectively are shown as independent members with the latter passing through the former.

A fusible element 20 is placed in bore 16 of stem 14 so as to plug or close that bore. In FIG. 1, bore 16 is shown enlarged at its handle end to there receive and seat a larger fusible element 20 then it would otherwise accommodate. The same feature is shown in FIG. 3 except that it is the interior end portion of bore 16b which is enlarged and which receives and seats fusible element 20b. In FIG. 2 fusible element 20a is shown in the handle end of bore 16a; there is no enlargement of the bore.

In the form of the invention shown in FIG. 3 there is a separate plunger 22 which is crimped into bore 16b against fusible element 20b. While fusible element 20b seals bore 16b and is accordingly tightly engaged against the inner wall of stem 14b, plunger 22 is not so engaged and, were it not for fusible element 20b, could move longitudinally of bore 16b, at least to the extent of the enlarged portion thereof.

FIGS. 4–7 show stems 14c–14f respectively as not hollow but solid. Bores 16c–16f respectively extend only a portion of the way into the stems at the interior end thereof.

FIG. 4 is similar to FIG. 3 except for the showing of the non-hollow stem 14c just indicated and except that fusible element 20c is itself hollow or at least partially so.

FIG. 5 shows a short solid fusible element 20d in bore 16d. There is no requirement here that element 20d seal bore 16d and in fact element 20d is slidably retained in bore 16d. Bearing between fusible element 20d and plunger 22 on the one hand and the closed end of bore 16d on the other hand is a standard compression spring 24.

Figure 6:
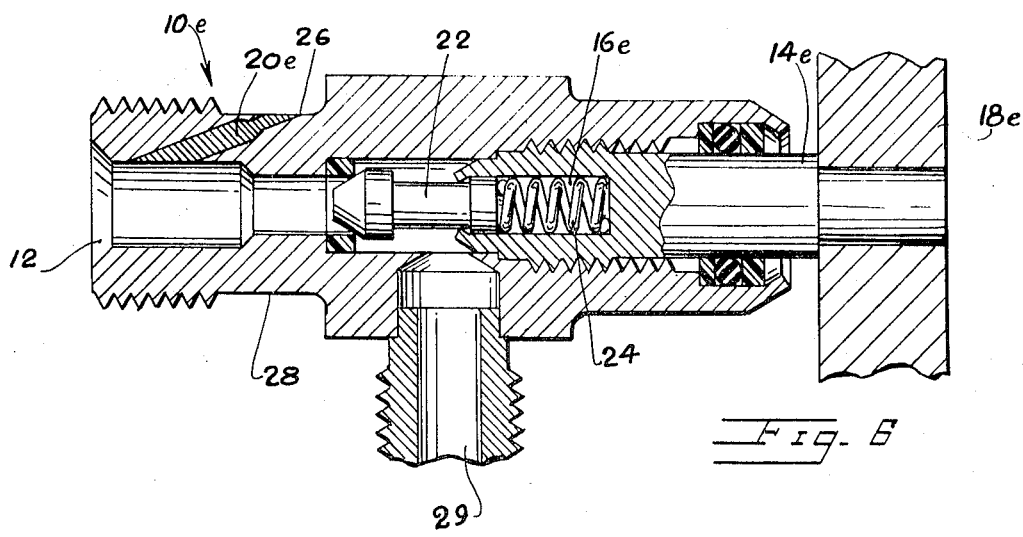
FIG. 6 is a partial cross-sectional view of a third form of the valve automatic pressure release means of the present invention.

FIG. 6 shows spring 24 in bore 16e as in FIG. 5 except that fusible element 20e is omitted from the bore and spring 24 bears directly against plunger 22. Fusible element 20e is in a hole 26 provided for the purpose in the main body of valve 10e. Hole 26 communicates between main port 12 and the external field. Fusible element 20e closes and seals hole 26 and may fill hole 26 in its entirety. If the main body of valve 10e is cast it is, of course, possible to place hole 26 in any location subject to the above and, if the mold is destructible, hole 26 could assume any configuration. If hole 26 is drilled it can again be placed anywhere. Consideration of quantity production and industrial economy dictate otherwise, however, and a die-cast valve body incorporating hole 26 may preferably have the alignment and configuration shown.

That alignment and configuration facilitates use of a non-destructable pin portion of the die. Hole 26 would be located at an angle through a reduced neck 28 portion of valve 10e from port 12 to the external field. The angle is such that when the longitudinal axis of hole 26 is extended in the direction of the longitudinal axis of port 12 it does not intersect any portion of valve 10e. This would permit withdrawal of the die pin after casting.

FIG. 6 further shows hole 26 as having a larger diameter adjacent port 12 than it has adjacent the external field. This would also permit downward withdrawal of the die pin from the finished casting. It is optional as will be indicated in the description of the operation.

Figure 7:
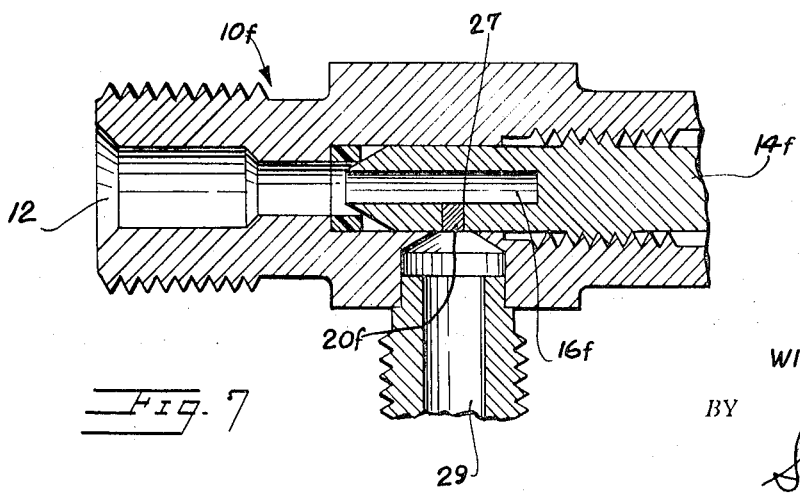
FIG. 7 is a fragmentary cross-sectional view of a forth form of the valve automatic pressure release means of the present invention.

FIG. 7 shows valve 10f without a plunger and with bore 16f extended sufficiently far into stem 14f so as to pass the position of a branch port 29. A hole 27 in stem 14f extends from bore 16f through to branch port 29, hole 27 being at that location when stem 14f is in its closed position. Fusible element 20f is in and seals hole 27.

DESCRIPTION OF OPERATION OF PREFERRED EMBODIMENTS OF THE INVENTION

The fusible elements, in all forms of the invention, block or cause the blocking of a path of communication between the relatively higher pressure of the system and the relatively lower pressure of the external field or branch port 29. Removal or elimination of the fusible elements, by whatever means, opens that path of communication and permits reduction of the system pressure.

1. Thermal operation: Generally speaking, there is a direct if not linear relation between the temperature of a closed fluid (liquid and/or gas) system and its pressure. Thus, when undesirably high system temperatures are experienced, there may also be undesirably high system pressures. The present invention accordingly provides a temperature-responsive pressure relief means.

The fusible plugs, by judicious use of materials, can be manufactured to melt at virtually any desired temperature or temperatures. Assuming that temperature has been attained in the modes of the invention shown in FIGS. 1, 2 and 6, the fusible plug will melt out of bore 16 or 16a (FIGS. 1 and 2) or hole 26 (FIG. 6) and permit escape of system pressure to the external field. In the mode of FIG. 7, fusible plug 20f will melt out of hole 27 to permit escape of system pressure to the lower pressure field of branch port 29. In the mode of FIG. 3, fusible plug 20b will melt out through bore 16b allowing withdrawal of plunger 22 and escape of system pressure out branch port 29. The mode of FIG. 5 is the same in this respect as that of FIG. 4 except that the melted material can flow into that portion of bore 16c occupied by spring 24.

2. Mechanical operation: It is to be realized that the fusible element will melt only when its own temperature reaches that criticality; the temperature of the fusible element may be only slightly related to the temperature at a remote section of the system. Unfortunately perhaps from the point of view of safety a remote, even localized, temperature rise will precipitate a system-wide pressure rise. Accordingly the present invention provides an automatic pressure release although the fusible element may not have reached its melting temperature by reason for example, of delayed heat transfer.

In the forms of the invention shown in FIGS. 1, 2 and 7, high system pressure relative to field pressure will simply push the fusible element out of its seat (bore or hole 27). The friction between the element and its seat will determine the "blow out" pressure and the friction is in turn determined by the seat surface condition—rough or smooth—and the method of insertion of the fusible element. In the form of the invention shown in FIG. 6, the shape of hole 26 will also determine the susceptability of fusible element 20e to be blown out. In the modes of the invention shown in FIGS. 5 and 6, excess system pressure will push plunger 22 open against the selected bias of spring 24 and permit relief of system pressure to branch port 29.

There is thus shown a unique automatic pressure release means incorporated into the structure of a system valve for releasing system pressure. While the foregoing is illustrative of preferred forms of the invention, it is clear that other forms and modifications can be had within the broad scope of the invention and of the appended claims.

What is claimed is:

1. An automatic pressure release valve, comprising:
   a. a valve interposed between a pressure system and a field;
   b. said valve having a stem which is at least partially hollow;
   c. a fusible element, said fusible element being adapted upon reaching melting temperature to release said pressure system;
   d. said fusible element being located in said valve stem hollow;
   e. said fusible element being adapted to slide in said hollow and being responsive to pressure within said system to relieve said system at a predetermined pressure; and
   f. a spring being located in said hollow and bearing against said fusible element to resist such sliding.

* * * * *